US008108871B2

(12) United States Patent
Rhine et al.

(10) Patent No.: US 8,108,871 B2
(45) Date of Patent: Jan. 31, 2012

(54) CONTROLLING COMPUTER RESOURCE UTILIZATION

(75) Inventors: Scott A. Rhine, Frisco, TX (US); Hyun J. Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1543 days.

(21) Appl. No.: 11/034,685

(22) Filed: Jan. 13, 2005

(65) Prior Publication Data

US 2006/0156309 A1   Jul. 13, 2006

(51) Int. Cl.
*G06F 9/46* (2006.01)
*G06F 15/173* (2006.01)

(52) U.S. Cl. ......................... 718/104; 718/105; 709/226
(58) Field of Classification Search .................. 709/223; 710/260; 718/104–105
See application file for complete search history.

(56) References Cited

U.S. PATENT DOCUMENTS

| | | | |
|---|---|---|---|
| 4,080,649 A * | 3/1978 | Calle et al. ........................ | 710/48 |
| 4,216,528 A * | 8/1980 | Robertson ......................... | 700/95 |
| 5,537,542 A * | 7/1996 | Eilert et al. ..................... | 709/201 |
| 5,675,739 A * | 10/1997 | Eilert et al. ..................... | 709/226 |
| 5,748,468 A * | 5/1998 | Notenboom et al. ............. | 700/3 |
| 5,889,956 A * | 3/1999 | Hauser et al. ................. | 709/226 |
| 5,898,870 A * | 4/1999 | Okuda et al. .................. | 718/104 |
| 5,925,102 A * | 7/1999 | Eilert et al. ..................... | 709/226 |
| 6,105,053 A * | 8/2000 | Kimmel et al. ............... | 718/105 |
| 6,119,143 A * | 9/2000 | Dias et al. ..................... | 709/201 |
| 6,243,838 B1 * | 6/2001 | Liu et al. ........................ | 714/57 |
| 6,263,359 B1 * | 7/2001 | Fong et al. .................... | 718/103 |
| 6,385,639 B1 * | 5/2002 | Togawa ......................... | 709/200 |
| 6,418,459 B1 * | 7/2002 | Gulick ........................... | 718/104 |
| 6,442,583 B1 * | 8/2002 | Eilert et al. .................... | 718/104 |
| 6,477,561 B1 * | 11/2002 | Robsman ....................... | 718/105 |
| 6,760,910 B2 * | 7/2004 | Eilert et al. .................... | 718/104 |
| 6,782,410 B1 * | 8/2004 | Bhagat et al. ................. | 709/201 |
| 6,859,926 B1 * | 2/2005 | Brenner et al. ............... | 718/100 |
| 6,957,434 B2 * | 10/2005 | Saito et al. ..................... | 718/103 |
| 7,039,012 B2 * | 5/2006 | Nakano et al. ................ | 370/230 |
| 7,103,745 B2 * | 9/2006 | Koning et al. ................ | 711/173 |
| 7,243,352 B2 * | 7/2007 | Mandava et al. ............. | 718/104 |
| 7,290,260 B2 * | 10/2007 | Miller ........................... | 718/104 |
| 7,444,640 B2 * | 10/2008 | Partanen ....................... | 718/105 |
| 7,500,241 B1 * | 3/2009 | Flockhart et al. ............. | 718/102 |
| 7,584,475 B1 * | 9/2009 | Lightstone et al. ........... | 718/104 |
| 7,665,090 B1 * | 2/2010 | Tormasov et al. ............ | 718/104 |
| 2002/0111996 A1 * | 8/2002 | Jones et al. ................... | 709/203 |
| 2002/0156824 A1 * | 10/2002 | Armstrong et al. ........... | 709/104 |
| 2002/0161817 A1 * | 10/2002 | Dorofeev et al. ............. | 709/104 |

(Continued)

FOREIGN PATENT DOCUMENTS

| | | |
|---|---|---|
| JP | 62175832 | 8/1987 |
| JP | 2004 246552 | 9/2004 |

*Primary Examiner* — Emerson Puente
*Assistant Examiner* — Adam Lee

(57) ABSTRACT

In one embodiment, a method comprises (i) identifying a group associated with an executable that is using a resource of a computer system, (ii) decrementing a group utilization limit for the resource when the group utilization limit is greater than zero, (iii) decrementing a utilization reserve for the group when the group utilization limit for the resource equals zero, wherein operations (i)-(iii) are performed by a software routine responsive to system interrupts, and (iv) scheduling another executable to use the resource, wherein the scheduling verifies that (a) the another executable belongs to a group that has a non-zero group utilization limit for the resource or (b) the another executable belongs to a group that has a non-zero utilization reserve.

12 Claims, 2 Drawing Sheets

U.S. PATENT DOCUMENTS

| | | | |
|---|---|---|---|
| 2002/0194251 A1* | 12/2002 | Richter et al. | 709/105 |
| 2003/0055863 A1* | 3/2003 | Spiegel et al. | 709/104 |
| 2003/0177165 A1* | 9/2003 | Bradley et al. | 709/105 |
| 2004/0226016 A1* | 11/2004 | Sreejith | 718/104 |
| 2005/0149932 A1* | 7/2005 | Hasink et al. | 718/100 |
| 2006/0101224 A1* | 5/2006 | Shah et al. | 711/173 |
| 2008/0228644 A1* | 9/2008 | Birkestrand et al. | 705/40 |

* cited by examiner

CONTROLLING COMPUTER RESOURCE UTILIZATION

TECHNICAL FIELD

The present application is generally related to controlling resource utilization in a computer system.

BACKGROUND

It is frequently desirable to place computer executables into distinct groups. The groups may be defined by user login identifier(s), user classes (e.g., student, teacher, administrator, etc.), application name, and/or the like. Additionally, in a shared computing environment running multiple executables, it is often advantageous for computer managers to place a limit on resource utilization by executables based on the group classifications of the executables. The limitations can be used for program predictability, to maintain isolation between groups, capacity management, or to ensure that users only receive the service level to which they are entitled. In known computing systems such limitations are frequently encoded as "shares" (maximum shares of a limited resource) and are sometimes referred to as "caps."

A number of technologies have been implemented to enforce share allocation schemes. However, known technologies impose significant overhead thereby reducing application performance. Moreover, known technologies cause additional reductions in performance upon certain combinations of applications within respective groups. For example, using known capping technologies, it is possible that a single executable of a group may consume all of the resources (e.g., processor cycles) assigned to the group before another executable of the same group has an opportunity to access the resource. The other executables of the same group may then not have an opportunity to obtain processor resources for several minutes.

SUMMARY

In one embodiment, a method comprises (i) identifying a group associated with an executable that is using a resource of a computer system, (ii) decrementing a group utilization limit for the resource when the group utilization limit is greater than zero, (iii) decrementing a utilization reserve for the group when the group utilization limit for the resource equals zero, wherein operations (i)-(iii) are performed by a software routine responsive to system interrupts, and (iv) scheduling another executable to use the resource, wherein the scheduling verifies that (a) the another executable belongs to a group that has a non-zero group utilization limit for the resource or (b) the another executable belongs to a group that has a non-zero utilization reserve.

In another embodiment, a computer readable medium comprises a first software routine that (i) determines a respective processor utilization limit for each of a plurality of processors and for each of a plurality of groups and (ii) determines a utilization reserve parameter for each of the plurality of groups, a second software routine that (i) identifies groups of executables that are using the plurality of processors, (ii) decrements respective processor utilization limits of identified groups when processor utilization limits are greater than zero, and (iii) decrements utilization reserve parameters of identified groups, when processor utilization limits of identified groups equal zero, wherein the second software routine is called in response to system interrupts, and a third software routine for scheduling executables to run on the plurality of processors, wherein the third software routine, when an executable is selected for a processor, is operable to verify that (i) the selected executable belongs to a group having a processor utilization limit for the processor that is greater than zero or (ii) the executable belongs to a group having a utilization reserve that is greater than zero.

In another embodiment, a computer system comprises means for identifying a group associated with an executable using a processor of the computer system, means for decrementing a group utilization limit for the processor when the group utilization limit is greater than zero, means for reducing a utilization reserve for the group when the group utilization limit for the processor, wherein the means for identifying, means for decrementing, and means for reducing are operable in response to system interrupts, and means for scheduling another executable to use the processor, wherein the means for scheduling verifies that (a) the another executable belongs to a group that has a non-zero group utilization limit for the processor or (b) the another executable belongs to a group that has a non-zero utilization reserve.

DETAILED DESCRIPTION

Some representative embodiments are directed to systems and methods for limiting resource utilization according to a share or cap based scheme. Specifically, processes are organized into groups and each group is provided a share of a resource or resources. The resources may include processor time, disk bandwidth of a shared channel, network bandwidth on a shared port, or any other resource that can be expressed in shares per unit of time. For the purposes of this discussion, only processor resources shall be discussed. However, representative embodiments are not so limited.

At a predefined interval (e.g., once per second), an allocator software module is executed to determine what allocation of resources to the groups is "fair" on a per group basis and a per processor level. A total number of clock "ticks" available to each group is calculated using the total number of available processors and each group's share. A tick is a known term that is related to the time between system interrupts and, in many systems, system interrupts occur at fixed intervals. For example, in recent Linux systems, system interrupts occur 1000 times per second. However, solely for the purpose of the present discussion, it is assumed that system interrupts occur 100 times per second. The portion of the total number of ticks for each group are divided between the processors assigned to each group. Each group is then allowed the number of calculated ticks (the group processor limit) on the assigned processor. Additionally, a portion of the total number of ticks of each group are assigned to a "charity" reserve for newly instantiated executables or old executables that were instantiated under a prior set of allocation rules. The charity reserves enable selected processes, that would otherwise not receive access to a processor, to make a degree of forward progress.

Upon each interrupt, an accountant software module is executed. Using the respective groups, the accountant software module attributes a tick for each processor. When a group processor limit is reached by a group on a given processor, the accountant software module determines whether any ticks remain in the group's charity reserve. If so, the group's charity reserve is reduced. If the processor limit is reached and the charity reserve is depleted, the executable is switched off the processor. Also, in one embodiment, a scheduler software module performs a second tier of share enforcement. The scheduler software module is used to decide which executable is next to be run on the processor. The scheduler software module does not allow an executable associated with a group that has reached the group processor limit to be selected when the group's charity reserve is depleted.

Figure 1:
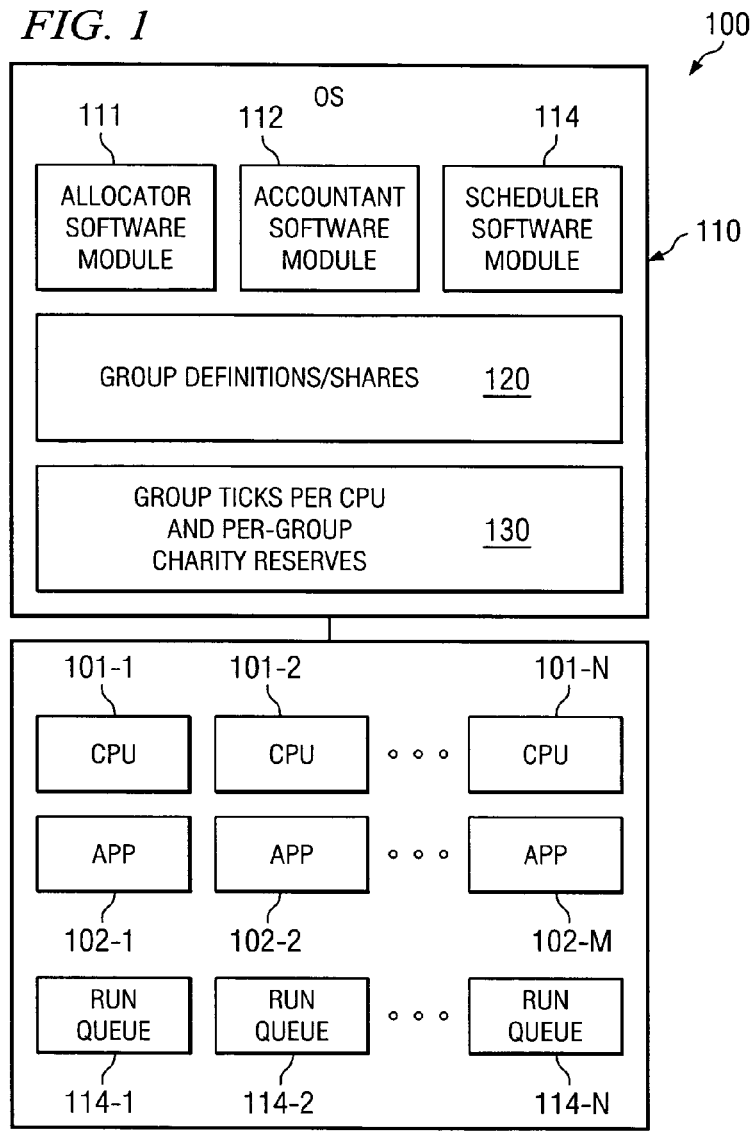
FIG. 1 depicts a system that allocates resources according to one representative embodiment.

Referring now to the drawings, FIG. 1 depicts system 100 that allocates processor resources according to one representative embodiment. Specifically, system 100 includes a plurality of executables (shown as applications 102-1 through 102-M) that are executed on CPUs 101-1 through 101-N. System 100 includes operating system 110 that includes software routines within the operating system kernel for determining which applications 102 are to be executed on which CPUs 101.

As shown in FIG. 1, operating system 110 includes allocator software module 111. Allocator software module 111 is used to determine how processing resources are to be allocated within respective predetermined periods. In one embodiment, allocator software module 111 is called once per second and determines the allocation of processor resources for the next second as measured by the system clock. Allocator software module 111 allocates processor resources upon the basis of groups. In one embodiment, a suitable data structure 120 is maintained to define the groups and the shares of resources associated with each group. The data structure 120 may also contain information indicating which CPUs 101 are assigned to execute executables belonging to particular groups. When an executable is created (e.g., by a "fork" command or other suitable command), the characteristics of the executable are analyzed (e.g., user login ID, class of the user, the filename of the executable, and/or the like). Depending upon the analysis, the data structure (not shown) associated with the process is updated to reflect the appropriate group.

Each time allocator software module 111 is called, allocator software module 111 calculates the total amount of processor resources available for each group for the next allocation period using the share information stored in data structure 120. Depending upon which groups are assigned to which CPUs 101, it is possible that the groups assigned to a given CPU 101 may possess a total of more than 100 ticks. Accordingly, allocator software module 111 may normalize the ticks on a per CPU basis. Additionally, allocator software module 111 also assigns a portion of the processor cycles to a charity reserve for each group. In one embodiment, the charity reserve is applied across CPUs 101. The charity reserve enables new executables that were created after the start of the allocation period to obtain processor resources. Also, the charity reserve enables older executables that were instantiated before a change in system allocation characteristics to obtain processor resources. Accordingly, such executables are prevented from "starving" and are allowed to make some forward progress The allocation data may be stored in a suitable data structure (shown as structure 130 in FIG. 1).

To illustrate the generation of allocation data according to one representative embodiment, it is assumed that system 100 includes four CPUs 101. Also, it is assumed that a "students" group is assigned a 51% cap of the system processor resources. Using the formula "group_limit=cap*number_of_processors*100" to generate the group ticks cap, the student group is assigned 204 clock ticks. In one embodiment, the greater of one clock tick and 1% of the group limit is "donated" to the charity reserve. For the student group, 2 clock ticks are assigned to the student charity reserve. The remaining clock ticks are then divided between CPUs 101. If the student group is assigned to execute on only three CPUs (101-1 through 101-3), 67 ticks are provided to each of the CPUs for the student group. The additional clock tick omitted due to rounding is donated to the student charity reserve.

It is further assumed that an "administrator" group receives a 10% cap and is assigned to execute on only CPU 101-1. The administrator group then receives 40 clock ticks (4*100*0.10). One of those clock ticks is donated to the administrator charity reserve. As previously noted, 67 clock ticks on CPU 101-1 have already been assigned. Specifically, a total of 106 (39+67) ticks of time to be performed per second have been assigned for CPU 101-1 with only 100 ticks available for CPU 101-1. Accordingly, normalization preferably occurs to ensure that only 100 clock ticks are assigned per CPU 101. Any rounding excess generated by the normalization operation is redistributed to the charity reserve.

It is also assumed that a "miscellaneous" group receives a 25% cap (100 ticks) and is assigned to CPU 101-4 with one clock tick donated to the miscellaneous charity reserve.

The following table summarizes the ticks calculated for the various groups and charity reserves:

|  | CPU 1 | CPU 2 | CPU 3 | CPU 4 | RESERVE |
| --- | --- | --- | --- | --- | --- |
| Student | 63 | 67 | 67 | 0 | 7 |
| Admin | 37 | 0 | 0 | 0 | 3 |
| Miscellaneous | 0 | 0 | 0 | 99 | 1 |
| Unused |  |  |  |  | 56 |

A system interrupt occurs in system 100 of FIG. 1 every tick and accountant software module 112 is called to enforce the clock tick limitations. Accountant software module 112 determines which executables are on the respective CPUs 101 and determines to which groups the executables belong. For each CPU 101, accountant software module 112 decrements the previously calculated group ticks. When a group tick count reaches zero for a particular group and CPU 101, account software module 112 determines whether there are ticks within the per-group charity reserve. If so, the current executable is allowed to continue and the charity reserve is decremented. When a group tick count for a respective CPU 101 and group reaches zero and the charity reserve also reaches zero, the executable belonging to that group is switched off the respective CPU 101.

Scheduler software module 113 determines which executable is next when an executable is switched off a CPU 101, an executable completes its operations, the executable enters a sleep state, and/or the like. Scheduler software module 113 may maintain a run queue (shown as 114-1 through 114-N) for each CPU 101 to perform the scheduling determination. Scheduler module 113 may be implemented using known scheduler algorithms except scheduler module 113 verifies that the next executable belongs to a group having ticks remaining on the respective CPU or ticks remain in the charity reserve. Also, if there are no jobs of a given group left on a respective CPU 101, the group's remaining ticks are provided to the charity reserve.

Figure 2:
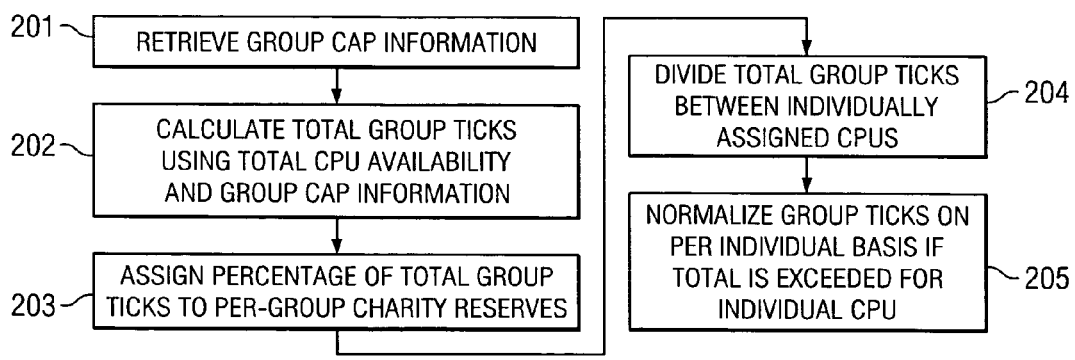
FIG. 2 depicts a flowchart for determining amounts of CPU resources measured in clock ticks for allocation to a plurality of groups of executables according to one representative embodiment.

FIG. 2 depicts a flowchart for determining amounts of CPU resources measured in clock ticks for allocation to a plurality of groups of executables according to one representative embodiment. The operations shown in FIG. 2 may be implemented using suitable code or software instructions within allocator software module 111. The code or software instructions can be stored on any suitable computer readable medium. In one embodiment, the operations shown in FIG. 2 are performed once per second.

In step 201, group cap information is retrieved from a suitable data structure. In step 202, a total number of group ticks for the next allocation period is calculated using total CPU availability and the group cap information. A percentage of the total group ticks are assigned to respective per-group charity reserves (step 203). In step 204, the total group ticks are divided between individually assigned CPUs for each group. In step 205, the group ticks are normalized to ensure that the total group ticks for each individual CPU does not exceed the availability of ticks for the respective CPU. Any rounding errors that result from the preceding calculations may be donated to the charity reserves.

Figure 3:
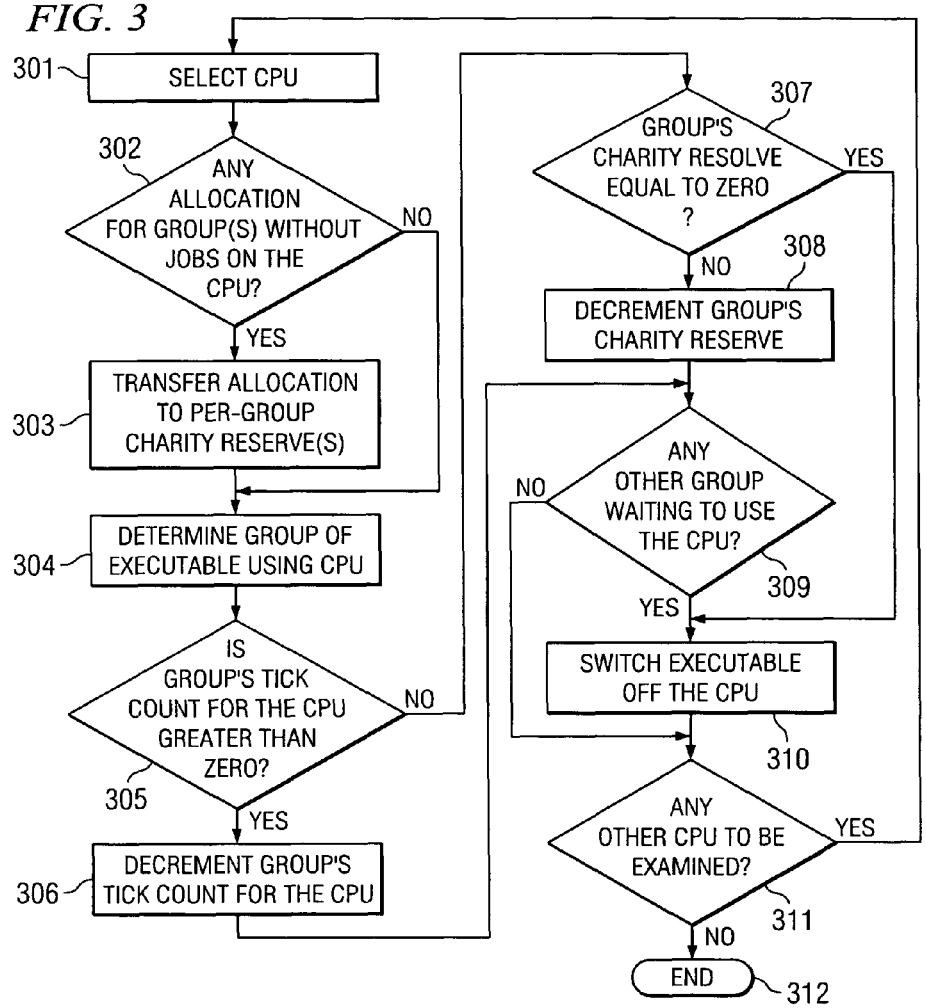
FIG. 3 depicts a flowchart for accounting for resource utilization according to one representative embodiment.

FIG. 3 depicts a flowchart for accounting for CPU utilization according to one representative embodiment. The operations shown in FIG. 3 may be implemented using suitable code or software instructions within accountant software module 112. The code or software instructions can be stored on any suitable computer readable medium. In one embodiment, the operations shown in FIG. 3 are performed upon each system interrupt.

In step 301, a CPU is selected for examination. In step 302, a logical comparison is made to determine whether there is any allocation for a group or groups without jobs on the CPU. If so, the process flow proceeds to step 303 where the per-group allocation is transferred to the respective charity reserve(s). If not, the process flow proceeds to step 304.

In step 304, the group of the executable currently using the CPU is determined. In step 305, a logical comparison is made to determine whether the group's tick count for the CPU is greater than zero. If so, the process flow proceeds to step 306 where the group's tick count is decremented. If not, the process flow proceeds to step 307 where another logical comparison is made to determine if the group's charity reserve is equal to zero. If the charity reserve does not equal zero, the charity reserve is decremented (step 308). If the charity reserve equals zero, the executable is switched off the CPU (step 310).

The process flow transitions from each of steps 306 and 308 to step 309. In step 309, a logical comparison is made to determine whether another group is waiting to use the CPU. If yes, the current executable is switched off the CPU (step 310) to allow an executable of another group to access to the CPU pursuant to a scheduling algorithm. If not, the process flow proceeds to step 311. In step 311, a logical comparison is made to determine whether there is another CPU to be examined. If so, the process flow returns to step 301. If not, the process flow ends (step 312).

Figure 4:
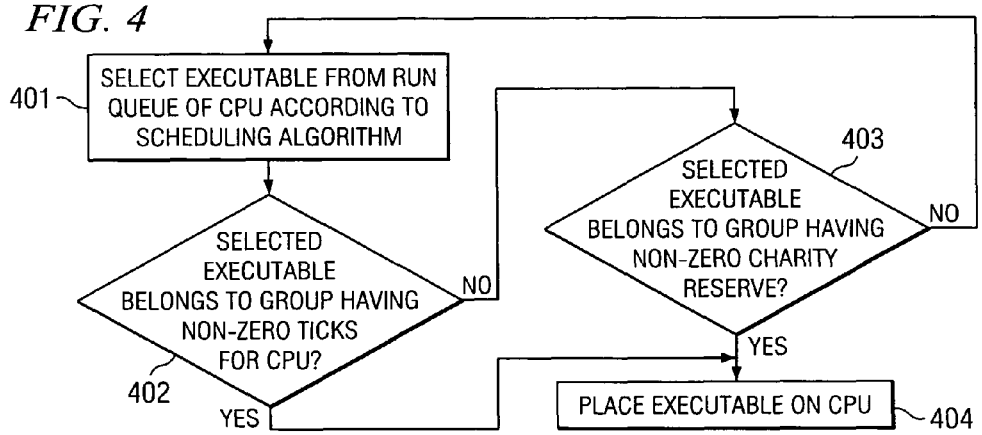
FIG. 4 depicts a flowchart for selecting an executable to be placed on a CPU according to one representative embodiment.

FIG. 4 depicts a flowchart for selecting an executable to be placed on a CPU according to one representative embodiment. The operations shown in FIG. 4 may be implemented using suitable code or software instructions within scheduler software module 113. The code or software instructions can be stored on any suitable computer readable medium. The operations shown in FIG. 4 may be performed when an executable terminates, an executable is placed into a sleep state, an executable is switched off the CPU (see step 310 of FIG. 3), and/or the like.

In step 401, an executable is selected from the run queue of a respective CPU according to a known or later developed scheduling algorithm. In step 402, a logical comparison is made to determine if the executable belongs to a group having non-zero ticks for the respective CPU. If so, the executable is placed on the CPU (step 404). If not, another a logical comparison is made in step 403. In step 403, a logical comparison is made to determine whether the executable belongs to a group having non-zero charity reserve. If so, the executable is placed on the CPU (step 404). If not, the process flow returns to step 401 to select another executable.

Some representative embodiments provide a number of advantages. For example, some representative embodiments involve a relatively high precision for allocation and accounting operations. Additionally, some representative embodiments impose relatively low overhead on system resources to manage utilization operations. Application performance is not appreciably hindered. Also, the low overhead allows for large multiprocessor scaling to occur in an efficient manner. Unlike known workload management (WLM) capping technologies, some representative embodiments provide fair allocation to executables within an accuracy of approximately one-half percent over one second. Accordingly, some representative embodiments exhibit appreciable improved performance given that approximately 95 percent of UNIX processes complete in under one second. Additionally, IO intensive workloads exhibit significantly improved performance according to some representative embodiments, because a group can request resources when needed instead of being forced into an arbitrary pre-defined scheduling slot.

As used herein, the phrase "computer readable medium" refers to a type of non-transitory physical hardware storage that can be read by a computer. A "job" is an executable (i.e., a set, series, or stream of instructions) that can be assigned, allocated, and/or dispatched to an individual processor for execution. Herein, a "processor" is an execution unit, e.g., a core, to which a job can be assigned. Herein, a "group" is a set or class of jobs. Herein, "when" is used to denote the occurrence of an event for which a response is to be specified. Herein, a "group utilization limit" is an amount of resource units expressed as a product of a resource type (e.g., processor) and time-based units (e.g., ticks) that a group of jobs is permitted to utilize in a given allocation period. Herein, an "allocation period" is a duration for resources that can be allocated to jobs. Herein, a "tick" is a duration within an allocation period that marks when utilization is evaluated to ensure group utilization limits are being met; in practice, interrupts can be used to demark ticks.

Referring to the previously presented table, the "Student", "Admin", and "Miscellaneous" rows correspond to respective groups of executable jobs. The "CPU 1", "CPU 2", "CPU 3", and "CPU 4" columns correspond to respective processors. The values in the cells at the intersections of the group rows and processor columns are the group-processor allocations in processor ticks per allocation period for respective combinations of groups and processors; group-processor allocations are set (e.g., at method segments 204 and 205). At the beginning of each allocation period, group-processor counts are set equal to respective group-processor allocations; group-processor counts are decremented (e.g., at method segment 306) each tick during an allocation period to reflect usage of a respective processor by a job in the respective group. The values in the cells at the intersection of a group row and the rightmost "Reserve" column are the group-reserve allocations for respective groups (e.g., set at method segment 203).

At the beginning of each allocation period, group-reserve counts are set equal to respective group-reserve allocations; group-reserve counts are decremented (e.g., at method segment 308) each tick during an allocation period to reflect usage of a respective processor by a job of a respective group once the respective group-processor counts have reached zero.

What is claimed is:

1. A method comprising:

determining a number of resource-utilization units of resources of a computer system to be allocated among plural groups for an allocation period, each of said groups containing one or more jobs to be executed using said resources;

assigning group allocations of said resource-utilization units to each of said groups so that each of said groups is assigned a respective group number of said resource-allocation units, said allocations including, for each of said groups, a respective group-reserve allocation of a respective positive integer group-reserve number less than the respective group number of said resource-utilization units, and for each combination of one of said groups and one of said resources, a respective group-resource allocation of a respective non-negative integer group-resource number of said resource-utilization units, at least one of said group-resource allocations consisting of a positive integer group-resource number of said resource-utilization units; and switching off a job from one of said resources at a time during said allocation period determined in part by said allocations, wherein the respective group number is equal to the sum of the respective group-reserve number and the respective group-resource numbers;

the respective group number represents a total number of resource-utilization units allocated to that group;

for each of said resources, the respective group-resource number represents that portion of the respective group number associated with that resource and allocated to that group; and the respective group-reserve number represents that portion of the respective group number allocated to that group but not associated with any of said resources.

2. A method as recited in claim 1 further comprising, for each of said one or more jobs executing on a respective one of said resources during said allocation period, after each consumption of one of said resource-utilization units by the job:

determining whether a respective group-resource count is greater than zero, the group-resource count being set so that, at the beginning of said allocation period, it equals the number of said resource-utilization units in the group-resource allocation;

if so, decrementing the group-resource count; and if not, determining whether a group-reserve count is greater than zero, the group-reserve count having been set so that, at the beginning of said allocation period, it equals the number of resource-utilization units of the respective group-resource allocation;

if so, decrementing a group-reserve count for the group; and if not, switch the job off the resource.

3. A method as recited in claim 2 further comprising, after said switching off, executing another job on the resource only if either:

the group-resource count for the combination of the group to which said another job belongs and the resource is non-zero; or the group-reserve count for the group to which said another job belongs is non-zero.

4. A method as recited in claim 1 wherein said resources are processors, said jobs are executables, and said resource-utilization units are processor ticks.

5. A computer system comprising:

plural hardware resources for executing jobs, said resources being divisible into temporal resource-utilization units;

an allocator module configured to determine a number of said temporal resource-utilization units to be allocated among plural groups for an allocation period, each of said groups containing one or more jobs to be executed using said resources, each of said jobs belonging to exactly one of said groups;

assign group allocations of said resource-utilization units to each of said groups so that each of said groups is assigned a respective group number of said resource-allocation units, said allocations including, for each of said groups, a respective group-reserve allocation of a respective positive integer group-reserve number less than the respective group number of said temporal resource-utilization units, and for each combination of one of said groups and one of said resources, a respective group-resource allocation of a respective non-negative integer group-resource number of said temporal resource-utilization units, at least one of said group-resource allocations consisting of a positive integer group-res0urce number of said temporal resource-utilization units;

an accountant module configured to switch off a job from one of said resources at a time during said allocation determined in part by said allocations, wherein, for each of said groups:

the respective group number is equal to the sum of the respective group-reserve number and the respective group-resource numbers;

the respective group number represents a total number of resource-utilization units allocated to that group;

for each of said resources, the respective group-resource number represents that portion of the respective group number associated with that resource and allocated to that group; and the respective group-reserve number represents that portion of the respective group number allocated to that group but not associated with any of said resources.

6. A computer system as recited in claim 5 wherein said accountant module is further configured to, during said allocation period, for each of said one or more jobs executing on a respective one of said resources, after each consumption of one of said temporal resource-utilization units by the job:

determine whether a respective group-resource count is greater than zero, said group-resource count being set so that, at the beginning of said allocation period, it is equal to the number of said temporal resource-utilization units of the respective group-resource allocation;

if so, decrement said group-resource count; and if not, determine whether a respective group-reserve count is greater than zero, the group-reserve count having been set so that, at the beginning of said allocation period, it is equal to the number of temporal resource-utilization units of the respective group-resource allocation for the group;

if so, decrement the group-reserve count; and
if not, switch the job off the resource.

7. A computer system as recited in claim 6 further comprising a scheduler module configured to, after said switching off, execute another job on the resource only if either:
the group-resource count for the combination of the group to which said another job belongs and the resource is non-zero; or
the group-reserve count for the group to which said another job belongs is non-zero.

8. A computer system as recited in claim 5 wherein said resources are processors, said jobs are executables, and said temporal resource-utilization units are processor ticks.

9. A computer product comprising non-transitory computer-readable storage media encoded with:
an allocator software module configured to, when executed by a processor,
determine a number of resource-utilization units of resources of a computer system to be allocated among plural groups for an allocation period, each of said groups containing one or more jobs to be executed using said resources;
assign group allocations of said resource-utilization units to each of said groups so that each of said groups is assigned a respective group number of said resource-allocation units, said allocations including,
for each of said groups, a respective group-reserve allocation of a respective positive integer group-reserve number less than the respective group number of said resource-utilization units, and
for each combination of one of said groups and one of said resources, a respective group-resource allocation of a respective non-negative integer group-resource number of said resource-utilization units, at least one of said group-resource allocations consisting of a positive integer resource number of said resource-utilization units;
an accountant software module configured to, when executed by said processor switch off a job from one of said resources at a time during said allocation period determined in part by said allocations, wherein for each of said groups:
the respective group number is equal to the sum of the respective group-reserve number and the respective group-resource numbers;
the respective group number represents a total number of resource-utilization units allocated to that group;
for each of said resources, the respective group-resource number represents that portion of the respective group number associated with that resource and allocated to that group; and
the respective group-reserve number represents that portion of the respective group number allocated to that group but not associated with any of said resources.

10. A computer product as recited in claim 9 wherein said resource-utilization units are temporal resource-utilization units and said accountant software module is further configured to, for each of said one or more jobs executing on a respective one of said resources, after the consumption of each said resource-utilization units by the job:
determine whether a group-resource count is greater than zero, the group-resource count being set so that it equals the number of resource-utilization units of the respective group-resource allocation at the beginning of said allocation period;
if so, decrement the group-resource count; and
if not, determine whether a group-reserve count is greater than zero, the group-reserve count being set so that it equals the number of resource-utilization units of the respective group-reserve allocation at the beginning of said allocation period;
if so, decrement the group-reserve count; and
if not, switch the job off the resource.

11. A computer product as recited in claim 10 wherein said media is further encoded with a scheduler module configured to, when executed by a processor, after said switching off, execute another job on the resource during said allocation period only if either:
the group-resource count for the combination of the group to which said another job belongs and the resource is non-zero; or
the group-reserve count for the group to which said another job belongs is non-zero.

12. A computer system product as recited in claim 9 wherein said resources are processors, said jobs are executables, and said resource-utilization units are processor ticks.

* * * * *

UNITED STATES PATENT AND TRADEMARK OFFICE
CERTIFICATE OF CORRECTION

PATENT NO. : 8,108,871 B2
APPLICATION NO. : 11/034685
DATED : January 31, 2012
INVENTOR(S) : Scott A. Rhine et al.

It is certified that error appears in the above-identified patent and that said Letters Patent is hereby corrected as shown below:

In the Claims:

In column 8, lines 32-33, in Claim 5, delete "group-res0urce" and insert -- group-resource --, therefor.

In column 9, line 35, in Claim 9, delete "resource" and insert -- group-resource --, therefor.

In column 10, line 39, in Claim 12, delete "computer system" and insert -- computer --, therefor.

Signed and Sealed this
Eighth Day of October, 2013

Teresa Stanek Rea
*Deputy Director of the United States Patent and Trademark Office*